United States Patent [19]

Roth

[11] Patent Number: 4,667,702

[45] Date of Patent: May 26, 1987

[54] TRIM-TO-LENGTH DUCT

[75] Inventor: James E. Roth, DeSoto, Mo.

[73] Assignee: Intertherm Inc., St. Louis, Mo.

[21] Appl. No.: 899,170

[22] Filed: Aug. 22, 1986

[51] Int. Cl.[4] .............................................. F16L 9/00
[52] U.S. Cl. .................................. 138/162; 138/166;
138/168; 428/58; 428/100; 428/36
[58] Field of Search ............... 138/162, 166, 168, 155;
428/99, 58, 36

*Primary Examiner*—Alexander S. Thomas
*Attorney, Agent, or Firm*—Jerome A. Gross

[57] ABSTRACT

A two-piece plastic duct utilizing snap-together latch tongue and complementary engaging provisions together with overlapping sealing flanges to make adequately airtight duct assemblies. The duct walls consist of narrow trimming flats with measurement indicia; these flats are divided by narrower molded separators, which make it easy to trim the unassembled duct to desired length.

7 Claims, 4 Drawing Figures

TRIM-TO-LENGTH DUCT

FIELD OF THE INVENTION invention relates to ducts made of plastic and particularly to those ducts for field-installation of rooftop air conditioners on vans, travel trailers, boats, and the like.

DESCRIPTION OF THE PRIOR ART

Field-installed rooftop air conditioners conventionally use sheet metal ducts to extend between the roof-mounted air conditioning units and the interior air distributor systems. A particular problem for the field installer is the amount of time consumed in measuring the length of duct required and in marking and cutting the sheet metal duct to its required length, such cutting often being inexact.

In the field of designing molded plastic parts for interfit with each other, securement has in some instances been accomplished by engaging latch tongues, projecting from one part, into loops molded on the mating part. Applicant knows of no such use in the duct-making field.

SUMMARY OF THE INVENTION

The present invention is a plastic air duct utilizing two identical halves, each having an included angle of 180°, which are assembled by snap-together latch tongue and complementary engaging provisions, preferably loops molded along their edges parallel to the axis of the assembled duct. Overlapping sealing flanges make the assembly adequately airtight.

Before assembly the two pieces are readily trimmed to the required length by the field installer; who may use a simple cutting tool, such as ordinary tin snips, to cut along narrow trimming flats. Narrow markings, which delineate these flats, denote the positions of internal separator ridges which serve as cutting guides. The tongues and complementary loops of the securing mechanism are aligned with these markings; they do not block access to any trimming flat. Molded indications of measurement on the trimming flats, measured progressively from a mounting flange, provide an easy guide for cutting the exact length of duct needed for assembly.

DESCRIPTION OF THE PREFERRED EMBODIMENT

Figure 1:
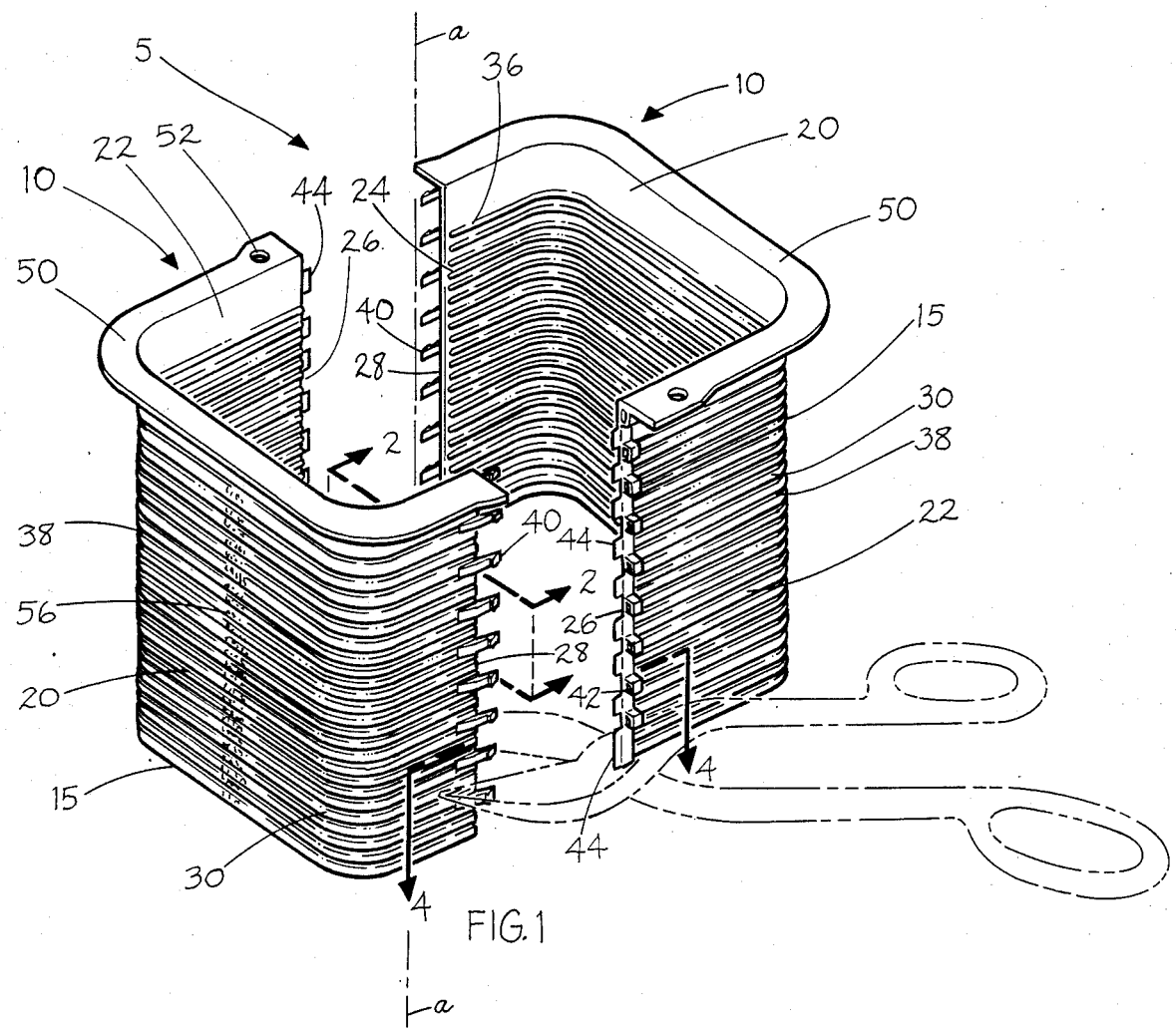
FIG. 1 is an exploded assembled view of a substantially square duct embodying the present invention. Tin snips, in phantom lines, show how the duct is trimmed to a desired length.

The duct generally designated 5 of the present invention is formed from two identical duct halves, generally designated 10 and shown in FIG. 1, molded from a high temperature, impact-resistant plastic.

Each duct half 10 consists principally of a wall 15 formed, relative to a longitudinal duct axis a—a, to a total included angle of 180°. In the example illustrated, the duct to be formed is essentially square with rounded corners; hence the duct half 10 includes an intermediate wall portion 20 from which two side walls extend roundedly at substantially 90°; one side wall being a long wall 22 and the other a short wall 24. These long and short walls 22, 24 terminate in side wall edges 26, 28 parallel to the axis a—a of the duct 5.

The wall 15 of each duct half 10 is comprised of a plurality of narrow trimming flats 30 alternating with interior guide ridges 36, substantially narrower than the flats 30, and their corresponding and still narrower exterior markings, which in this embodiment are separator grooves 38. The trimming flats 30 extend continuously between the side wall edges 26, 28 and perpendicularly to the duct axis a—a. The shallow narrow grooves 38 on the outer surface denote the centerlines of the ridges 36.

Along the upper edge of the duct half wall 15 is a flange 50, perpendicular to the duct axis a—a, useful for mounting the duct 5, as to an appliance, by means of screw apertures 52 adjacent to each long wall edge 26 of the duct 5. Measurement indicia 56 on the trimming flats 30 along the intermediate wall portion 20, are measured progressively from the mounting flange 50; these provide a quick measuring guide of duct length.

Figure 2:
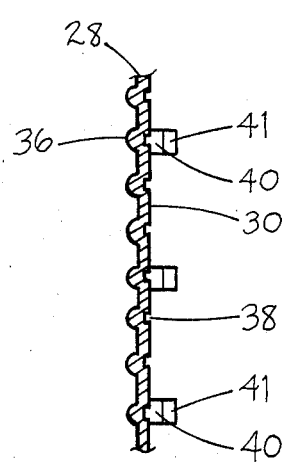
FIG. 2 is a cross-sectional view taken along plane 2—2 of FIG. 1.
Figure 3:
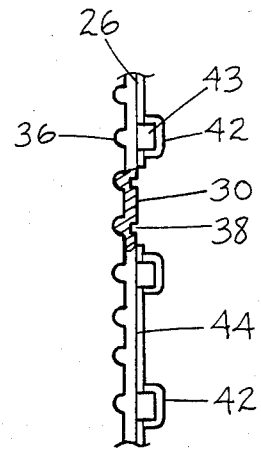
FIG. 3 is an edge view of the corresponding portion of cross-section 2—2 of FIG. 2 which is partly broken away.
Figure 4:
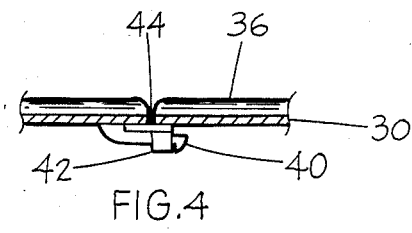
FIG. 4 is a cross-sectional view along line 4—4 of FIG. 1 with the parts being shown assembled.

Means for assembling two identical duct halves to form a complete duct, are provided along their side wall edges 26, 28, best shown in FIGS. 2 and 3. The short wall edges 28 have, on their outer sides, elongated projecting latch tongues 40 in alignment with some of the separator grooves 38. The ends of the latch tongues 40 have small detents 41 which lock the tongues 40 in place when snapped through the openings 43 of loops 42 located along the long wall edge 26 of a mating duct half 10, shown in locked position in FIG. 4. The loop openings 43 are centered on the same separator grooves 38 as the corresponding tongues 40; this alignment makes it possible to use fairly wide loops 42 without interferring with access to any of the trimming flats 30.

To provide airtight seals at the junctures of the two duct halves 10, short sealing flange elements 44 extend beyond the long wall edge 26 at a level outward of the trimming flats 30. Each sealing flange 44 is spaced from the next to allow entry of the latch tongues 40 into the loop openings 43. When duct halves so constructed are used by a field installer of a vehicle rooftop air conditioning unit, for example, he may readily refer to the measurement indicia 56 to trim the duct halves 10 to the length required. Prior to connecting to an interior distributor box plenum, a simple cutting tool, such as the tin shears shown in phantom lines in FIG. 1, may be used to cut the duct halves 10 along a chosen trimming flat 30. The internal separator ridges 36 adjacent to the flat serve as guides for the cutting tool.

From this disclosure, modifications of the invention, departing from the foregoing described embodiment, will be apparent. For example, the duct half configuration might be chosen as half-round, half-hexagonal, etc., the total included angle in each case being 180°. It is therefore to be understood that within the scope of the appended claims, the invention may be practiced otherwise than as here specifically described.

I claim:

1. A trim-to-length duct comprising
   two identical duct halves molded from high temperature, impact resistant plastic, each half having a wall formed to a total included angle of 180°, which wall terminates in side edges parallel to the axis of said duct, said wall being comprised of a plurality of trimming flats extending perpendicular to such axis and substantially continuously between said side edges, together with separator means, narrower than said flats and alternating therebetween, whereby to guide a cutting shears, one of the said side wall edges having latch tongues projecting therefrom, in alignment with some of said separator means, each said tongue being sufficiently narrow to permit access alongside it to each of the adjacent trimming flats, the other side wall edge having means for receiving and engaging said tongues.

2. A duct as defined in claim 1, wherein the said other side wall edge has sealing flange elements continuing beyond said wall edge at a level immediately outward of said trimming flats, said sealing flange elements being separated by spaces sufficient to accept the latch tongues formed on the opposite side wall edge of the other said duct half.

3. A duct as defined in claim 1, said duct being substantially square, and each duct half wall including a large intermediate wall portion and two shorter side wall portions extending roundedly therefrom at substantially 90°.

4. A duct as defined in claim 1, wherein each duct half has a mounting flange outstanding along an edge perpendicular to the duct axis.

5. A duct as defined in claim 4, wherein said trimming flats have molded indications of measurement progressively from said mounting flange.

6. A duct as defined in claim 1, wherein said separator means are internal ridges in registration with markings on the duct outer surface delineating said trimming flats.

7. A trim-to-length duct comprising two identical duct halves molded from high temperature, impact resistant plastic, each half having a wall including a large intermediate wall portion and two shorter side wall portions extending roundedly therefrom at substantially 90°, to terminate in side edges parallel to the axis of said duct, said wall being comprised of a plurality of trimming flats extending perpendicular to such axis and substantially continuously between said side edges, together with separator means, narrower than said flats and alternating therebetween, whereby to guide a cutting shears, said separator means being internal ridges having centerlines in registration with markings on the duct outer surface delineating said trimming flats, one of the said side wall edges having latch tongues projecting therefrom, in alignment with some of said separator means, each said tongue being sufficiently narrow to permit access alongside it to each of the adjacent trimming flats, the other side wall edge having means for receiving and engaging said tongues, said other side wall edge further having sealing flange elements continuing beyond said wall edge at a level immediately outward of said trimming flats, said sealing flange elements being separated by spaces sufficient to accept the latch tongues formed on the opposite side wall edge of the other said duct half, each duct half further having a mounting flange outstanding along an edge perpendicular to the duct axis, said trimming flats having molded indications of measurement progressively from said mounting flange.

* * * * *